United States Patent [19]
Doi et al.

[11] Patent Number: 5,972,828
[45] Date of Patent: Oct. 26, 1999

[54] METHOD OF MANUFACTURING CATALYST FOR CLEANING EXHAUST GAS RELEASED FROM INTERNAL COMBUSTION ENGINE, AND CATALYST FOR THE SAME

[75] Inventors: Ryouta Doi, Naka-machi; Hidehiro Iizuka, Hitachinaka; Hiroshi Hanaoka, Kodaira; Toshio Ogawa, Takahagi; Osamu Kuroda; Hisao Yamashita, both of Hitachi; Yuichi Kitahara; Toshifumi Hiratsuka, both of Hitachinaka, all of Japan

[73] Assignee: Hitachi, Ltd., Tokyo, Japan

[21] Appl. No.: 08/943,151

[22] Filed: Oct. 3, 1997

[30] Foreign Application Priority Data

Oct. 3, 1996 [JP] Japan ..................... 8-26747

[51] Int. Cl.⁶ ..................... B01J 23/10
[52] U.S. Cl. ............. 502/302; 502/303; 502/304
[58] Field of Search ................... 502/302, 303, 502/304

[56] References Cited

U.S. PATENT DOCUMENTS

| | | | |
|---|---|---|---|
| 4,312,955 | 1/1982 | Bartley | ........................ 518/701 |
| 4,608,360 | 8/1986 | Abrevaya et al. . | |
| 5,128,305 | 7/1992 | Yoshimoto et al. . | |
| 5,208,203 | 5/1993 | Horiuchi et al. . | |
| 5,294,421 | 3/1994 | Muraki et al. . | |
| 5,736,482 | 4/1998 | Durand et al. | ........................ 502/303 |
| 5,762,892 | 6/1998 | Kasahara et al. . | |
| 5,804,152 | 9/1998 | Miyoshi et al. . | |
| 5,817,596 | 10/1998 | Akporiaye et al. . | |
| 5,853,679 | 12/1998 | Tabata et al. . | |

FOREIGN PATENT DOCUMENTS

| | | |
|---|---|---|
| 0 335 847 A1 | 10/1989 | European Pat. Off. . |
| 1-130735 | 5/1989 | Japan . |
| 1-266854 | 10/1989 | Japan . |
| 6-31139 | 2/1994 | Japan . |
| 3-74514 | 2/1995 | Japan . |
| 7-51544 | 2/1995 | Japan . |
| 7-171349 | 7/1995 | Japan . |
| 8-24643 | 1/1996 | Japan . |

*Primary Examiner*—Elizabeth D Wood
*Attorney, Agent, or Firm*—Evenson, McKeown, Edwards & Lenahan P.L.L.C.

[57] ABSTRACT

In order to remove nitrogen oxide in an exhaust gas released from a lean burn engine, a catalyst: supporting an rare earth metal, an alkali earth metal, titanium, a noble metal, and magnesium on the surface of a porous carrier made of inorganic oxides is provided. In order to manufacture the catalyst, the rare earth metal is supported onto the surface of the carrier first, subsequently the alkali earth metal other than magnesium and titanium are supported, the noble metal is supported, and magnesium is supported finally onto the surface of the carrier.

The catalyst of the present invention is scarcely poisoned by SOx in the exhaust gas released from the lean burn engine, and has a heat resistivity durable against high speed driving.

11 Claims, No Drawings

METHOD OF MANUFACTURING CATALYST FOR CLEANING EXHAUST GAS RELEASED FROM INTERNAL COMBUSTION ENGINE, AND CATALYST FOR THE SAME

CROSS-REFERENCE TO RELATED APPLICATION

This application is related to co-pending U.S. patent application Ser. No. 08/958,673, filed Oct. 27, 1997.

BACKGROUND AND SUMMARY OF THE INVENTION

This application claims the priority of JP8-26,1747, the disclosure of which is expressly incorporated by reference herein.

The present invention relates to a method for cleaning exhaust gas released from an internal combustion engine, particularly to a method for removing nitrogen oxides efficiently from the exhaust gas. The present invention also relates to a catalyst for removing the nitrogen oxides.

The exhaust gas released from the internal combustion engine. of a vehicle contains generally carbon monoxide (CO), hydrocarbons (HC), nitrogen oxides ($NO_x$), and other compounds, which are hazardous to the human body, and cause pollution. A great deal of effort has been devoted to decreasing the amount of these substances released from an engine. In addition to efforts to improve combustion conditions and decrease the amount of these substances released from an engine, methods for cleaning released exhaust gas, the method using both a three way catalyst, primarily composed of Pt, Rh, Pd, and the like, for oxidizing HC and CO, and, at the same time, reducing $NO_x$ to make them harmless is the most common. The three way catalyst is aimed at cleaning the exhaust gas, of which the air to fuel ratio (obtained by A(weight of air)/F(weight of fuel)) is set approximately at a stoichiometric ratio (14.7).

However, in order to decrease fuel consumption by the engine, a lean-burn engine, which is operated with an A/F leaner than the stoichiometric A/F, has currently been developed. As one, of the conditions of the lean-burn engine, the content of oxygen in the exhaust gas from the lean-burn engine is increased. Therefore, $NO_x$ cannot be removed efficiently, because the catalytic activity of the three way catalyst in the presence of oxygen is low. Accordingly, as a $NO_x$ removing technology for supporting the lean burn engine, a catalyst which reduces $NO_x$ with unburned hydrocarbons or carbon monoxide (called the lean $NO_x$ catalyst hereinafter) to eliminate the $NO_x$ from the exhaust gas in the presence of oxygen has been developed. For instance, a catalyst, which is composed of transition metals such as copper and the like are supported on a carrier such as zeolite, is disclosed in JP-A-1-130735 (1989) and JP-A-1-266854 (1989). An utilization system of the catalyst of the same is disclosed in JP-A-3-74514 (1991).

One of the problems to be solved in the development of the lean $NO_x$ catalyst is adding $SO_x$ resistivity to the catalyst. Fuel, such as gasoline, and the like for the internal combustion engine, contains sulfur to the amount of from ten ppm to as much as 1000 ppm. Sulfur generates $SO_x$, which causes catalyst poisoning. $SO_x$ is composed of $SO_2$ and $SO_3$. In the case of removing $NO_x$ from the lean-burn exhaust gas, $SO_2$ is readily oxidized to $SO_3$ because of the presence of oxygen. Therefore, the catalyst is readily poisoned by $SO_x$ and the addition of the $SO_x$ resistivity is indispensable for the lean $NO_x$ catalyst. Hitherto, a method for fixing $SO_x$ by forming a complex sulfate which is readily decomposable (JP-A-7-51544 (1995)), and a method for suppressing the oxidation of $SO_2$ (JP-A-7-171349 (1995) ) have been disclosed.

Furthermore, because the catalyst for removing hazardous substances from exhaust gas is used in an atmosphere at a high temperature in the range of approximately 300° C. to 500° C., the catalyst is recquired to have a sufficient catalytic activity even after being exposed to the above temperature condition for a long time, and concurrently, to have heat resistivity resisting temperatures in the range of 800° C. to 900° C., temperature conditions of high speed driving.

SUMMARY OF THE INVENTION

One of the objects of the present invention is to provide a catalyst which can suppress poisoning by sulfur oxides in the exhaust gas by lean-burn combustion and has a high heat resistivity.

After extensive investigation on methods for adding $SO_x$ resistivity to the lean $NO_x$ catalyst, we have found that $SO_x$ resistivity could be added to the catalyst by making the catalyst contain an alkaline earth metal, titanium, magnesium, a rare earth metal, a one noble metal.

In order to obtain a catalyst having superior $SO_x$ resistivity, the method for manufacturing the catalyst is important. We have found that the method comprising the steps of supporting a rare earth metal onto a porous carrier first, supporting an alkaline earth metal other than magnesium, and titania next, subsequently, supporting a noble metal, and finally, supporting magnesium was effective for obtaining the catalyst having superior $SO_x$ resistivity.

The noble metal can be rhodium, platinum, or palladium. The catalyst of the present invention necessarily contains rhodium, and preferably contains at least either platinum or palladium.

Supporting an alkaline earth metal, titanium, a rare earth metal, and noble metal onto a porous carrier can be performed by any method such as the impregnating method, wherein the porous carrier is dipped into a solution containing a compound of a metal the kneading method, where raw materials containing the above metals are kneaded with the porous carrier or other methods.

When the catalyst of the present invention is manufactured by the impregnating method, the method desirably comprises the sequential steps of impregnating a solution containing a compound of rare earth metal into a porous carrier, calcining the dipped carrier, impregnating a solution containing a compound of alkaline earth metal except magnesium and a solution containing a compound of titanium into the porous carrier, calcining the dipped carrier, impregnating a solution containing a compound of noble metal into the porous carrier, calcining thee dipped carrier, then impregnating a solution containing a compound of magnesium into the porous carrier, and calcining the dipped carrier.

A complex of metal oxides of the alkaline earth metal other than magnesium, and titanium is preferably generated by the calcination.

Although any one of cerium, lanthanum, yttrium, and the like is usable as the rare earth metal, cerium is the most preferable. When the rare earth metal is supported onto the carrier by the impregnating method, for instance, an aqueous solution of the rare earth metal nitrate can be used as the raw material. The rare earth metal finally exists on the surface of the carrier in a form of oxide. A supported amount of the rare earth metal on the carrier is preferably in the range of 5 to 30 wt % (as metal element) to 100 parts by weight of the porous carrier Although any one of strontium, barium, calcium, and the like can be used as the alkaline earth metal other than magnesium, strontium is the most preferable. When the alkali earth metal is supported onto the carrier by the impregnating method, for instance, an aqueous solution of the alkali earth metal nitrate can be used as the raw material. A supported amount of the alkaline earth metal other than magnesium on the carrier is preferably in the range of 3 to 25 wt % (as metal element) to 100 parts by weight of the porous carrier.

A supported amount of titanium on the carrier is preferably in the range of 1 to 15 wt % (as metal element) to 100 parts by weight of the porous carrier. Titanium nitrate, titanium sulfate, titania sol, an organotitanium compound, and the like can be used as a raw material of titanium. However, in order to prevent the titanium sol from forming gel by mixing with an alkaline earth metal other than magnesium, a titanium sol containing approximately 25 wt % of nitric acid is preferably used. Titanium exists in the catalyst finally obtained in a form of a complex of metal oxides with the alkaline earth metal other than magnesium, and titania.

A supported amount of the noble metal on the carrier is preferably in the range of 0.05 to 0.3 wt % (as metal element) to 100 parts by weight of the porous carrier for rhodium, and each of platinum and palladium is preferably in the range of 0.5 to 3 wt % (as metal element), respectively. Dinitrodiamine platinum aqueous solution can be used as the raw material for platinum, and nitrates of rhodium and palladium can be used as the raw material for rhodium or palladium, respectively.

A supported amount of magnesium on the carrier is desirably in the range of 0.5 to 2 wt % (as metal element) to 100 parts by weight of the porous carrier. Magnesium nitrate can be used as the raw material for magnesium. Magnesium exists in the catalyst as an oxide.

Inorganic oxides such as alumina, silica, and the like can be used as the carrier of the catalyst of the present invention. However, alumina is the most preferable, Alumina coated onto a substrate made of cordierlite, and the like, is preferably used.

The exhaust gas cleaning catalyst of the present invention can be applied to lean-burn vehicles, GDI (gasoline direct injection) vehicles, and the like. The air-to-fuel ratio, A/F, of the lean-burn engine is generally in the range of 18 to 23, and that of the GDI engine reaches approximately 50. The catalyst of the present invention has a preferable cleaning performance to the exhaust gas released from internal combustion engines of which A/F is in the range of 18 to 50.

The catalyst of the present invention has a preferable $NO_x$ removing performance from lean burn exhaust gas. However, $NO_x$ removing performance is deteriorated gradually after processing lean burn exhaust gas continuously. The reason is that hydrocarbon and carbon monoxide, which are reducing agents of $NO_x$ are oxidized by oxygen contained in the lean burn exhaust gas, accordingly, the amount of the reducing agents becomes insufficient, and $NO_x$ is accumulated onto the surface of the catalyst. Therefore, the $NO_x$ accumulated on the surface of the catalyst is desirably reduced and removed sometimes by contacting with hydrocarbon or carbon monoxide by operating the internal combustion engine with a fuel rich condition in comparison with the stoichiometric A/F. The time of the operation with the fuel rich condition in comparison with the stoichiometric A/F is sufficiently in the range of ten seconds to a few minutes.

In accordance with the catalyst of the present invention, the $SO_x$ resistivity is assumed to be improved by co-existence of a complex of alkaline earth metal and titanium, titania, and rare earth metal compound. Furthermore, the presence of alkaline earth metal such as strontium other than magnesium in a form of, for instance, strontium nitrate thermally stabilizes the catalyst to improve thermal resistivity.

DETAILED DESCRIPTION OF PREFERRED EMBODIMENTS

Hereinafter, the present invention is explained referring to practical embodiments. However, the present invention is not restricted by the practical embodiments.

(Embodiment 1)

Alumina slurry for coating was obtained by adding alumina powder into a solution of water, nitric acid, and boehmite powder, and kneading for three hours with a ball mill. Then an alumina coated honeycomb was obtained by coating the slurry onto previously wetted honeycombs made of cordierlite, drying, and calcining at 600° C. for one hour. The amount of alumina coat was 150 grams per one liter of the honeycomb.

The above alumina coat honeycomb was dipped into a cerium nitrate aqueous solution, dried, and calcined at 600° C. for one hour. Subsequently, the honeycomb was dipped into an impregnating solution prepared by mixing a strontium nitrate aqueous solution and titania sol solution, dried, and calcined at 600° C. for one hour. Then, the honeycomb was dipped into an aqueous solution containing platinum dinitrodiamine and rhodium nitrate, dried, and calcined at 450° C. for one hour. Finally, the honeycomb was dipped into an aqueous solution containing magnesium nitrate, dried, and calcined at 450° C. for one hour to obtain embodiment catalyst 1.

The metallic composition of embodiment catalyst 1 was Ce 18 wt. %, Sr 15 wt. %, Ti 10 wt. %, Pt 1.8 wt. %, Rh 0.15 wt. %, and Mg 1 wt. % to alumina. The composition was regarded as a standard to other embodiment catalysts.

An X-ray diffraction analysis was performed on the powder of embodiment catalyst 1 which did not support Pt, Rh, and Mg. The X-ray diffraction spectrum of a calcined body obtained by calcining a mixture of strontium and titanium sol at 600° C. for one hour had peaks of titania, a complex oxide of titania and strontium oxide ($SrTiO_3$), and strontium nitrate. It means that the calcined body supported a complex oxide of strontium titanate.

Embodiment catalyst 2 was obtained by the same method as embodiment 1 except using lanthanum nitrate as the rare earth metal. Similarly, embodiment catalyst 3 was obtained by the same method as embodiment 1 except using barium nitrate as the alkali earth metal.

(Comparative example 1)

Cerium was dipped into the alumina coat honeycomb prepared by the same method as embodiment 1 by the same steps as embodiment catalyst 1.

Subsequently, a strontium nitrate aqueous solution, which was not mixed with titania sol, was dipped into the honeycomb, dried, and calcined at 600° C. for one hour. Then, platinum, rhodium, magnesium were dipped into the honeycomb by the same method as embodiment catalyst 1 to obtain comparative example catalyst 1.

Comparative example catalyst 2 was obtained by the same method as comparative example catalyst 1 except using barium nitrate instead of strontiumnitrate.

The composition and the supporting order of the elements of the prepared embodiment catalysts 1~3 and the comparative example catalysts 1~2 are indicated in Table 1.

TABLE 1

| | Components Supporting Sequence | | | |
|---|---|---|---|---|
| | First Component | Second Component | Third Component | Fourth Component |
| Embodiment catalyst 1 | 18 wt % Ce | 15 wt % Sr 10 wt % Ti | 1.8 wt % Pt 0.15 wt % Rh | 1 wt % Mg |
| Embodiment catalyst 2 | 18 wt % La | 15 wt % Sr 10 wt % Ti | 1.8 wt % Pt 0.15 wt % Rh | 1 wt % Mg |
| Embodiment catalyst 3 | 18 wt % Ce | 15 wt % Ba 10 wt % Ti | 1.8 wt % Pt 0.15 wt % Rh | 1 wt % Mg |
| Embodiment catalyst 1 | 18 wt % Ce | 15 wt % Sr | 1.8 wt % Pt 0.15 wt % Rh | 1 wt % Mg |
| Embodiment catalyst 2 | 18 wt % Ce | 15 wt % Ba | 1.8 wt % Pt 0.15 wt % Rh | 1 wt % Mg |

(Test example 1)

The performance for removing nitrogen oxides of the embodiment catalysts 1~3 and the comparative example catalysts 1~2 were evaluated by the following testing method.

Each catalyst of 6 cc was packed into a quartz reaction tube of 25 mm in inner diameter, and the reaction tube was placed into a tubular electric furnace. The reaction tube was heated by the electric furnace. When a temperature of the gas at the entrance of the ctatalyst layer reached 300° C. the following simulated exhaust gas was started.

A model exhaust gas simulated a case when an engine was operated with a stoichiometric A/F (A/F=14.7), contained 0.1% of NO, 0.05% of $C_3H_6$, 0.6% of CO, 0.5% of $O_2$, 0.2% of $H_2$, 10% of $H_2O$, and residual of nitrogen. Another model exhaust gas, simulated a case when an engine was operated with a lean A/F (A/F=18), contained 0.06% of NO, 0.04% of $C_3H_4$, 0.1% of CO, 5% of $O_2$, 10% of $H_2O$, and residual nitrogen. Each of the model exhaust gases simulated the stoichiometric A/F and the lean A/F, respectively, was flowed into the reaction tube alternately for every three minutes. The space velocity of the model exhaust gas was 30,000/h, and $NO_x$ concentration at the entrance and the exit of the catalyst were determined by a chemiluminecent $NO_x$ analyzer. The determination of $NO_x$ was performed continuously, and the $NO_x$ cleaning rate was evaluated with the $NO_x$ concentration obtained at a time when fluctuation of the determined $NO_x$ concentration was diminished.

Practically, the $NO_x$ cleaning rate was evaluated with the observed $NO_x$ concentration obtained atone minute after fifth switching the flow of the stoichiometriLc model exhaust gas to the flow of the lean model exhaust gas started from the flow of the stoichiometric model exhaust gas. The $NO_x$ cleaning rate was calculated by the following equation:

$NO_x$ cleaning rate (%)=($NO_x$ concentration at the entrance–[$NO_x$ concentration at the exit)/($NO_x$ concentration at the entrance)]×100 . . . (Math. 1)

(Test example 2)

As same as the test example 1, when the temperature of the gas at the entrance of the reaction tube reached 300° C., the model exhaust gas simulated the lean A/F (A/F=18) plus 0.005% of $SO_2$ flowed for three hours with the space velocity of 30,000/h. Subsequently, $NO_x$ cleaning performance at 300° C. of the gas temperature at the entrance of the reaction tube was evaluated on embodiment catalysts 1~3 and the comparative example catalysts 1~2 by the same method as the test example 1.

The results of the test examples 1 and 2 on the embodiment catalysts 1~3 and the comparative example catalysts 1~2 are indicated in Table 2.

The results shown in Table 2 reveal that embodiment catalysts 1~3 have a higher $NO_x$ cleaning rate even after poisoned by $SO_2$ in comparison with the comparative example catalysts 1~2, and that embodiment catalysts 1~3 have preferable $SO_x$ resistivity.

TABLE 2

| | Test example 1 $NO_x$ cleaning rate % | Test example 2 $NO_x$ cleaning rate (%) after poisoned by $SO_2$ |
|---|---|---|
| Embodiment catalyst 1 | 92 | 79 |
| Embodiment catalyst 2 | 87 | 74 |
| Embodiment catalyst 3 | 87 | 72 |
| Comparative example catalyst 1 | 79 | 67 |
| Comparative example catalyst 2 | 75 | 63 |

(Embodiment 2)

Embodiment catalysts 4~6 were prepared by changing the supported amount of rare earth metal Ce of embodiment catalyst 1 to 5 wt %, 15 wt %, and 30 wt % respectively.

(Embodiment 3)

Embodiment catalysts 7~9 were prepared by changing the supported amount of noble metal Pt of embodiment catalyst 1 to 0.5 wt %, 1.5 wt %, and 3 wt %, respectively.

(Embodiment 4)

Embodiment catalysts 10~12 were prepared by changing the supported amount of noble metal Rh of embodiment catalyst 1 to 0.05 wt %, 0.18 wt %, and 0.3 wt %, 5 respectively.

The catalytic composition of embodiment catalyst 4~12 prepared in the above embodiments are indicated in Table 3.

The $NO_x$ cleaning rate before being poisoned by $SO_2$ and the $NO_x$ cleaning rate after poisoned by $SO_2$ of the embodiment catalysts 4~12 were evaluated by the same methods as the test examples 1 and 2. The results of the evaluation are indicated in Table 4.

The result indicated in Table 4 reveals that the embodiment catalysts supporting catalytic components in the range of 5~30 wt % Ce, 0.5~3 wt % Pt, and 0.05~0.3 wt % Rh, respectively, maintain a high $NO_x$ cleaning performance even after poisoned by $SO_2$.

TABLE 3

| | The supporting amount (wt %) | | | | | |
|---|---|---|---|---|---|---|
| | Ce | Sr | Ti | Pt | Ph | Mg |
| Embodiment Catalyst 4 | 5 | 15 | 10 | 1.8 | 0.15 | 1 |
| Embodiment Catalyst 5 | 15 | 15 | 10 | 1.8 | 0.15 | 1 |
| Embodiment Catalyst 6 | 30 | 15 | 10 | 1.8 | 0.15 | 1 |
| Embodiment Catalyst 7 | 18 | 15 | 10 | 0.5 | 0.15 | 1 |
| Embodiment Catalyst 8 | 18 | 15 | 10 | 1.5 | 0.15 | 1 |
| Embodiment Catalyst 9 | 18 | 15 | 10 | 3.0 | 0.15 | 1 |
| Embodiment Catalyst 10 | 18 | 15 | 10 | 1.8 | 0.05 | 1 |
| Embodiment Catalyst 11 | 18 | 15 | 10 | 1.8 | 0.18 | 1 |
| Embodiment Catalyst 4 | 18 | 15 | 10 | 1.8 | 0.3 | 1 |

TABLE 4

| | $NO_x$ cleaning rate (%) before poisoned by $SO_2$ | $NO_x$ cleaning rate (%) after poisoned by $SO_2$ |
|---|---|---|
| Embodiment Catalyst 4 | 83 | 72 |
| Embodiment Catalyst 5 | 92 | 79 |

TABLE 4-continued

|  | $NO_x$ cleaning rate (%) before poisoned by $SO_2$ | $NO_x$ cleaning rate (%) after poisoned by $SO_2$ |
|---|---|---|
| Embodiment Catalyst 6 | 84 | 71 |
| Embodiment Catalyst 7 | 83 | 73 |
| Embodiment Catalyst 8 | 90 | 76 |
| Embodiment Catalyst 9 | 92 | 75 |
| Embodiment Catalyst 10 | 82 | 71 |
| Embodiment Catalyst 11 | 89 | 75 |
| Embodiment Catalyst 12 | 89 | 72 |

(Embodiment 5)

Embodiment catalysts 13~15 were prepared by changing the supporting amount of alkaline earth metal Sr of embodiment catalyst 1 to 3 wt %, 18 wt %, and 25 wt %, respectively.

(Embodiment 6)

Embodiment catalysts 16~18 were prepared by changing the supporting amount of titanium sol (converted to Ti) of embodiment catalyst 1 to 1 wt %, 8 wt %, and 15 wt %, respectively.

The catalytic composition of embodiment -catalyst 13~18 prepared in the above embodiments are indicated in Table 5.

TABLE 5

|  | The supporting amount (wt %) | | | | | |
|---|---|---|---|---|---|---|
|  | Ce | Sr | Ti | Pt | Rh | Mg |
| Embodiment Catalyst 13 | 18 | 3 | 10 | 1.8 | 0.15 | 1 |
| Embodiment Catalyst 14 | 15 | 18 | 10 | 1.8 | 0.15 | 1 |
| Embodiment Catalyst 15 | 18 | 25 | 10 | 1.8 | 0.15 | 1 |
| Embodiment Catalyst 16 | 18 | 15 | 1 | 1.8 | 0.15 | 1 |
| Embodiment Catalyst 17 | 18 | 15 | 8 | 1.8 | 0.15 | 1 |
| Embodiment Catalyst 18 | 18 | 15 | 15 | 1.8 | 0.15 | 1 |

The $NO_x$ cleaning rate before being poisoned by $SO_2$ and the $NO_x$ cleaning rate after being poisoned by $SO_2$ of embodiment catalysts 13~18 were evaluated by the same methods as the test examples 1 and 2. The results of the evaluation are indicated in Table 6.

TABLE 6

|  | $NO_x$ cleaning rate (%) before poisoned by $SO_2$ | $NO_x$ cleaning rate (%) after poisoned by $SO_2$ |
|---|---|---|
| Embodiment Catalyst 13 | 84 | 73 |
| Embodiment Catalyst 14 | 90 | 78 |
| Embodiment Catalyst 15 | 83 | 72 |
| Embodiment Catalyst 16 | 82 | 72 |
| Embodiment Catalyst 17 | 90 | 78 |
| Embodiment Catalyst 18 | 85 | 71 |

The result indicated in Table 6 reveals that embodiment catalysts supporting catalytic components in the range of 3~25 wt %, Sr, and 1~15 wt % titanium sol (converted to Ti), respectively, maintain a high $NO_x$ cleaning performance before being poisoned by $SO_2$ and even after being poisoned by $SO_2$.

(Embodiment 7)

The initial $NO_x$ cleaning performance of embodiment catalysts 16~18 and the comparative example catalyst 1 were evaluated by the same methods as test example 1. Subsequently, the same catalysts as the above were calcined at 800° C. for five hours for thermal deterioration, and then, $NO_x$ cleaning performance was evaluated again by the same method as test example 1. The results of the evaluation are indicated in Table 7.

The result indicated in Table 7 reveals that embodiment catalysts 16~18 maintain a higher $NO_x$ cleaning performance than the comparative example catalyst 1 even after being thermally deteriorated.

TABLE 7

|  | Initial $NO_x$ cleaning rate (%) | $NO_x$ cleaning rate (%) after calcined at 800° C., for 5 hrs. |
|---|---|---|
| Embodiment Catalyst 16 | 83 | 75 |
| Embodiment Catalyst 17 | 91 | 80 |
| Embodiment Catalyst 18 | 82 | 73 |
| Comparative example catalyst 1 | 80 | 60 |

(Embodiment 8)

A honeycomb shaped catalyst, of which honeycomb volume was 1.7 liters, was manufactured with the catalyst composition of embodiment catalyst 1 and comparative example catalyst 1, respectively. The honeycomb shaped catalysts were thermally deteriorated by calcining at 800° C. for five hours in an electric furnace. The thermally deteriorated honeycomb shaped catalyst was installed at the middle of an exhaust gas duct under the floor of a lean burn engine mounted vehicle, and a constant speed driving test was performed on a chassis dynamometer. The driving speed was adjusted to vary the exhaust gas temperature, and the $NO_x$ cleaning rate of the honeycomb shaped catalyst was determined. The $NO_x$ cleaning rate, when the exhaust gas temperature at the entrance of the catalyst was 350° C., was 27% for the comparative example catalyst 1, and 40% for the embodiment catalyst 1, respectively. Embodiment catalyst 1 had a higher $NO_x$ cleaning rate in comparison with comparative example catalyst 1 even after thermally deteriorated.

In accordance with the present invention, the catalyst for cleaning the exhaust gas having both $SO_x$ resistivity and thermal resistivity can be obtained. Therefore, nitrogen oxides can be removed efficiently from the exhaust gas containing a large amount of oxygen, and $SO_x$.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A method of manufacturing a catalyst for cleaning an exhaust gas, said catalys: comprising a porous carrier comprising an inorganic oxide; magnesium and at least one alkaline earth metal other than magnesium; rhodium and at least one of platinum or palladium; a rare earth metal; and titanium, said method comprising the steps of:

(a) supporting the rare earth metal on a surface of the porous carrier, (b) supporting the at least one alkaline earth metal other than magnesium, and titanium, (c) supporting the rhodium and at least one of platinum or palladium, and (d) supporting magnesium.

2. The method of claim 1, further comprising calcining after steps of (a), (b), (c) and (d).

3. The method of claim 1, wherein step (b) further comprises forming a complex oxide of the titanium and the at least one alkaline earth metal other than magnesium.

4. The method of claim 1, wherein step (a) comprises supporting cerium on the surface of the porous carrier, step (b) comprises supporting strontium and titanium, and step (c) comprises supporting platinum and rhodium, sequentially.

5. The method of claim 1, wherein steps (a), (b), (c) and (d) comprise impregnating a plurality of solutions, each containing one of the above metals, into said porous carrier.

6. The method of claim 1, wherein said inorganic oxide comprises alumina.

7. The method of claim 6, wherein said alumina is coated onto a honeycomb substrate.

8. catalyst for cleaning exhaust gas released from an internal combustion engine which is operated with a leaner air-to-fuel ratio than a stoichiometric air-to-fuel ratio, comprising:

magnesium and at least one alkaline earth metal other than magnesium, rhodium and at least one of platinum or palladium, a rare earth metal, and titanium, on a surface of a porous carrier composed of an inorganic oxide, and a complex oxide of the at least one alkaline earth metal other than magnesium and titanium.

9. The catalyst of claim 8, wherein said surface of the porous carrier supports cerium, strontium, titanium, platinum, rhodium, and magnesium.

10. The catalyst of claim 8, wherein:

the rare earth metal comprises 5 to 30% by weight of the porous carrier, the at least one alkaline earth metal other than magnesium, comprise 3 to 25% by weight of the porous carrier, the titanium comprises 1 to 15% by weight of the porous carrier, the magnesium comprises 0.5 to 2% by weight of the porous carrier, and platinum comprising 0.5 to 3% by weight of the porous carrier and the rhodium comprising 0.05 to 3% by weight of the porous carrier.

11. The catalyst of claim 8, wherein said inorganic oxide comprises alumina and is coated onto a honeycomb substrate.

* * * * *